UNITED STATES PATENT OFFICE.

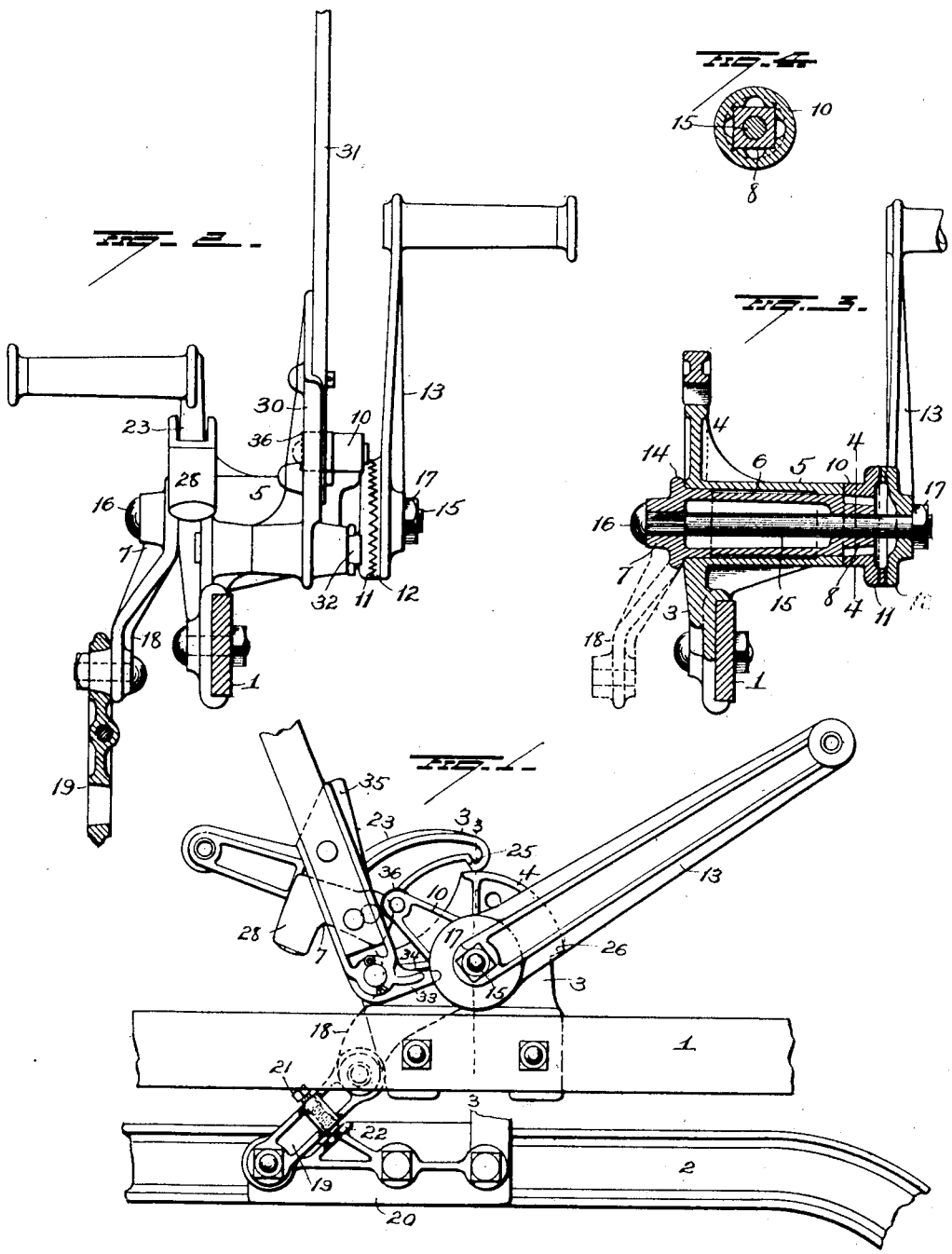

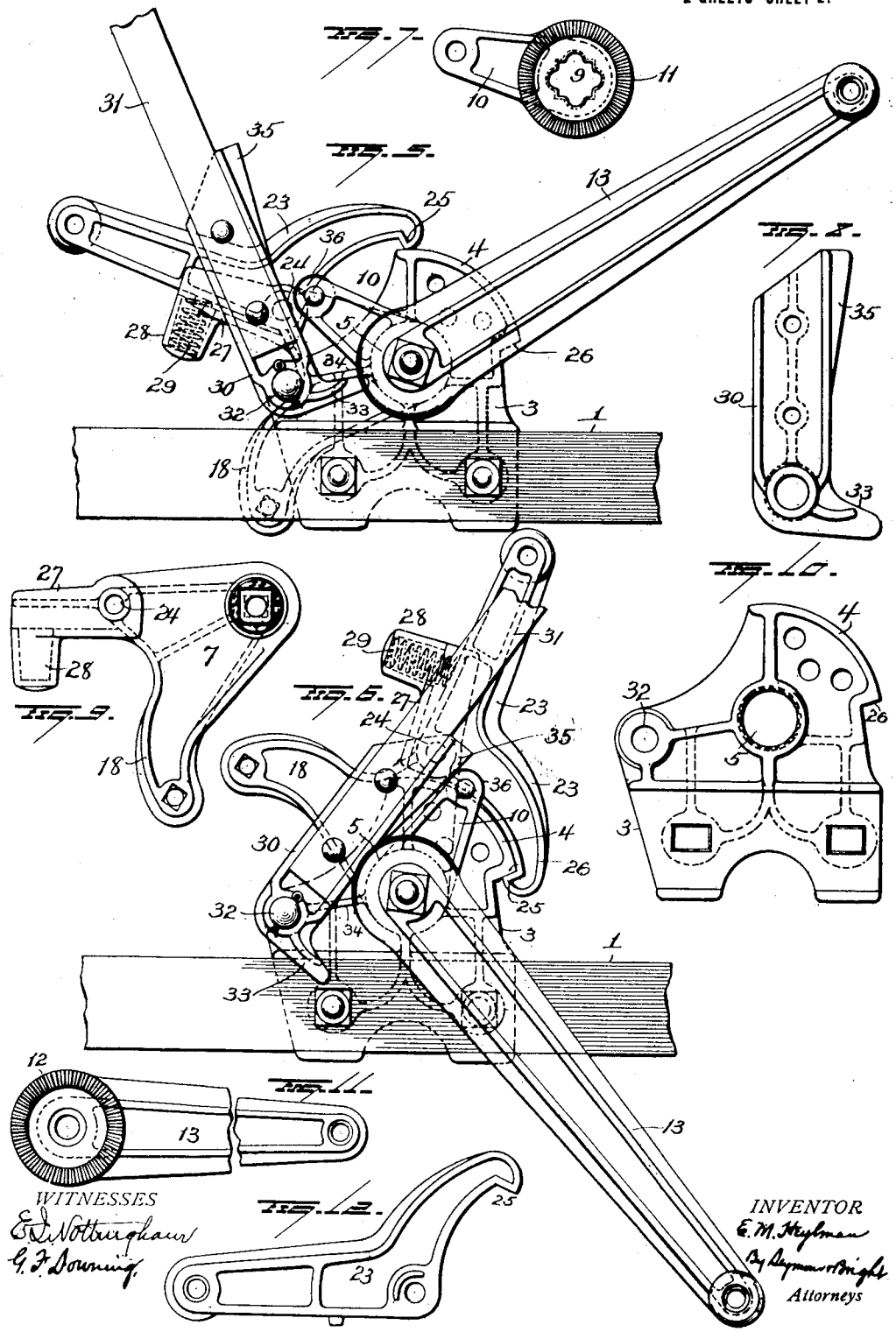

EDWARD M. HEYLMAN, OF SOUTH BEND, INDIANA, ASSIGNOR TO OLIVER CHILLED PLOW WORKS, OF SOUTH BEND, INDIANA.

PLOW.

1,258,681.   Specification of Letters Patent.   Patented Mar. 12, 1918.

Application filed January 2, 1917. Serial No. 140,214.

*To all whom it may concern:*

Be it known that I, EDWARD M. HEYLMAN, a citizen of the United States and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to lifting means for riding plows,—one object of the invention being to provide simple and efficient means for raising the plow by combined foot and hand power which may be operated simultaneously, and to so construct the mechanism that the hand operated means may be operated without necessity for unlocking the foot operated means, and so that the foot lever may be operated without manual manipulation of the hand lever.

A further object is to so construct the lifting mechanism that a maximum leverage will be applied at the initial part of the operation when the plow bases are in the ground and so that as the plow rises and the load thereon is reduced, the leverage will be decreased.

With these and other objects in view, the invention consists in certain novel features of construction and combinations of parts as hereinafter set forth and pointed out in the claims.

In the accompanying drawings; Figure 1 is a view in side elevation showing the application of my improvements; Fig. 2 is a view taken at right angles to Fig. 1, and partly in section; Fig. 3 is a sectional view on the line 3—3 of Fig. 1; Fig. 4 is a sectional view on the line 4—4 of Fig. 3; Fig. 5 is an elevation showing the positions of the parts when the plow is in normal working position; Fig. 6 is a similar view showing the positions of the part when the plow is raised, and Figs. 7, 8, 9, 10, 11 and 12 are views of details.

1 represents a portion of the horizontal frame of a riding plow structure, and 2 indicates the plow beam.

A bearing bracket 3 which supports the lifting mechanism, is secured to the frame 1 and projects upwardly therefrom. The upper portion of the bearing bracket 3 is formed with a segmental arm 4 (for a purpose hereinafter explained) and below this arm, said bracket is provided with a laterally projecting sleeve 5 which receives and constitutes a pivotal bearing for the hub 6 of a pivotal bracket 7. The hub 6 is provided at one end with an angular portion 8 to enter the angular opening 9 of an arm 10, said arm also having a bearing against one end of the hub 5 and at this end of the arm 10, the same is provided with an annular serrated or toothed portion 11, to mesh with a similar annular serrated or toothed portion 12 at one end of a foot lever 13. A flange 14 near one end of the hub 6 engages the bracket 3 and a bolt 15 (having a head 16 at one end and a nut 17 on the other end) passes through the hub 6 and the lever 13, and thus the foot lever 13 and arm 10 are adjustably connected together and both securely fastened to the pivotally mounted bracket.

The pivoted bracket 7 has a general triangular shape, being formed with a depending arm 18, with the lower end of which, the upper end of a link 19 is pivotally connected,—the other end of said link being pivotally attached to a bracket 20 secured to the plow beam 2. Movement of the link 19 is limited in one direction by the engagement of an adjustable screw 21 carried by said link, with a stop lug 22 on the bracket 20, as shown in Fig. 1.

A foot operated latch lever 23 is pivotally mounted at 24 on the pivoted bracket 7 and is provided with a tooth 25 to ride over the segmental arm 4 and engage shoulder 26 at one end thereof, as shown in Fig. 6. The pivoted bracket 7 is also provided with a forwardly projecting arm 27 having a pocket 28 in which latter, a spring 29 is located and adapted to bear against the latch lever to maintain the same in proper relation to the segment 4 and prevent its accidental release from said segment when said latch lever is in engagement with the shoulder 26.

With the construction and arrangement of parts thus far described, it will be seen that when the foot lever 13 is moved from the position shown in Fig. 5 to the position shown in Fig. 6, motion will be imparted through the pivoted bracket 7 and the link 19 to the plow for raising the latter. During these movements of the parts, the latch lever 23 will ride over the segment 4 and its tooth 25 will engage the shoulder 26 at one end of said segment, thus latching the plow in its raised position. To again release the plow and thus permit it to descend to working position, the operator will manipulate the latch lever to release the same from the segment, as will be readily understood.

A mounting 30 for a hand lever 31 is pivotally attached at 32 to the fixed bearing bracket 3 and is provided with a toe 33 to engage a rib or stop 34 on said bearing bracket 3 and thus retain the hand lever in its normal position as shown in Fig. 5. The hand lever mounting (which, in effect, constitutes an operative portion of the hand lever) is provided on its rear side with a cam rib or flange 35. The arm 10 hereinbefore described is provided with a roller 36 which normally occupies a position in proximity to the rear side or edge of the hand lever mounting below the rib 35, as shown in Fig. 5.

If the hand lever 31 be moved rearwardly from the position shown in Fig. 5 to the position shown in Fig. 6, the lever mounting 30 will engage the roller 36, and said roller will run along the rear side or edge of said lever mounting and the cam rib thereon, thus causing the arm 10 to move in the arc of a circle and the pivoted bracket 7 to be turned in a manner to raise the plow, through the medium of the link 19. It will be seen that when the hand lever is first moved, the roller on the arm 10 will engage the lever mounting 30 in comparative close proximity to the pivotal support of the latter, thus causing the application of a maximum leverage for the initial raising movement of the plow, when the plow base is in the ground and is therefore offering a maximum load or resistance. As the hand lever continues to move rearwardly and the bearing of the arm 10 against said lever moves farther from the pivotal support of the same and along the cam rib 35, the leverage will decrease,—such decrease in leverage occurring during the upward movement of the plow after the load or resistance offered to the ascent of the plow base has been overcome.

The hand lever may be operated as above described to raise the plow without necessity for unlocking the foot lever, or both hand and foot levers may be manipulated simultaneously by the operator to raise the plow when the ground being plowed is hard and more resistance is offered to the movement of the plow base out of the ground; or, if desired the foot lever may be manipulated without operating the hand lever.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a plow structure, the combination with a frame and a beam, of a bracket fixed to the frame and having a laterally projecting hub, a bracket lever having a hub mounted in the hub of the fixed bracket, a foot lever and an arm connected with the hub of the bracket lever and disposed at an angle to each other, a connection between said bracket lever and the beam, a hand lever mounted on the fixed bracket and in position to have sliding engagement with the arm on the hub of the bracket lever to impart motion to the latter for raising the plow.

2. In a plow structure, the combination with a frame and a beam, of a bracket fixed to the frame and having a laterally projecting hub, a bracket lever having a laterally projecting hub mounted in the hub of the fixed bracket, a foot lever and an arm connected with the hub of the bracket lever and disposed at an angle to each other, a connection between said bracket lever and the beam, a hand lever pivoted to the fixed bracket in position to having sliding engagement with the arm on the hub of the bracket lever, and a cam rib on the said hand lever above the part of said hand lever which first engages the arm on the hub of the bracket lever when the latter is operated to raise the plow.

In testimony whereof, I have signed this specification in the presence of two subscribing witnesses.

EDWARD M. HEYLMAN.

Witnesses:
EDWIN NICAR,
CHAS. A. WEBSTER.

Copies of this patent may be obtained for five cents each, by addressing the "Commissioner of Patents, Washington, D. C."